(12) United States Patent
Giloh et al.

(10) Patent No.: US 7,767,133 B2
(45) Date of Patent: *Aug. 3, 2010

(54) METHOD AND APPARATUS TO PRODUCE STRETCHABLE PRODUCTS

(75) Inventors: Ehud Giloh, Manchester (GB); Shmuel Grinshpan, Manchester (GB)

(73) Assignee: TamiCare, Ltd. (GB)

( * ) Notice: Subject to any disclaimer, the term of this patent is extended or adjusted under 35 U.S.C. 154(b) by 959 days.

This patent is subject to a terminal disclaimer.

(21) Appl. No.: 11/268,684

(22) Filed: Nov. 7, 2005

(65) Prior Publication Data

US 2006/0113714 A1 Jun. 1, 2006

Related U.S. Application Data

(60) Provisional application No. 60/625,480, filed on Nov. 5, 2004.

(51) Int. Cl.
*B29C 41/08* (2006.01)
*B29C 41/36* (2006.01)

(52) U.S. Cl. ............ 264/511; 264/510; 427/421.1

(58) Field of Classification Search ......... 264/510, 264/511; 427/421.1
See application file for complete search history.

(56) References Cited

U.S. PATENT DOCUMENTS

| | | | |
|---|---|---|---|
| 2,527,501 A | 10/1950 | Saks | |
| 2,691,611 A | 10/1954 | Saks | |
| 3,027,273 A | 3/1962 | Sacks et al | |
| 3,032,774 A | 5/1962 | Wade | |
| 3,791,783 A * | 2/1974 | Damon et al. ............. | 19/148 |
| 4,095,638 A * | 6/1978 | Thompson et al. ......... | 152/511 |
| 4,102,964 A | 7/1978 | Ridgeway | |
| 4,223,101 A * | 9/1980 | Fine et al. ................. | 528/76 |
| 4,539,396 A | 9/1985 | Yasui et al. .............. | 528/481 |
| 4,623,572 A | 11/1986 | Irrlitz et al. | |
| 4,808,458 A | 2/1989 | Watt et al. | |
| 5,138,719 A | 8/1992 | Orlianges et al. ........... | 2/168 |
| 5,338,565 A | 8/1994 | Shlenker et al. .......... | 427/2.25 |
| 5,359,735 A * | 11/1994 | Stockwell ................. | 2/243.1 |
| 5,645,884 A | 7/1997 | Harlow, Jr. et al. | |
| 6,645,884 B1 | 11/2003 | Yang et al. | |
| 6,699,419 B1 | 3/2004 | Kia et al. ................. | 264/219 |
| 6,987,210 B1 | 1/2006 | Giloh | |

(Continued)

FOREIGN PATENT DOCUMENTS

CH 682288 8/1993

(Continued)

*Primary Examiner*—Frederick J Parker
(74) *Attorney, Agent, or Firm*—McDonnell Boehnen Hulbert & Berghoff LLP

(57) ABSTRACT

The invention provides methods and apparatus for producing flexible, stretchable, and/or elastic products comprised principally of material such as natural elastomers and other synthetic polymers. The method and apparatus for producing stretchable products by spraying product material over a workpiece former, and method and apparatus for creating perforated products by spraying product material over a perforated surface or partly breathable surface, The invention also provides methods and apparatus for making double sided fibre coating of the product and, or to at least coating the product surface on the side facing the wall without the need for removing the product from the wall. The method and apparatus also enable easy removal of the product from the former. Workpiece formers are also provided.

7 Claims, 5 Drawing Sheets

U.S. PATENT DOCUMENTS

| | | |
|---|---|---|
| 7,354,424 B2 | 4/2008 | Giloh |
| 2003/0197311 A1 | 10/2003 | Stephenson et al. |
| 2004/0091504 A1 | 5/2004 | Hamann ................ 424/195.17 |
| 2004/0209062 A1 * | 10/2004 | Sebag ..................... 428/304.4 |
| 2005/0194713 A1 | 9/2005 | Erickson et al. ............. 264/255 |
| 2005/0222543 A1 | 10/2005 | Shao .......................... 604/292 |
| 2008/0292788 A1 | 11/2008 | Giloh |
| 2009/0035515 A1 | 2/2009 | Cecconi et al. |

FOREIGN PATENT DOCUMENTS

| | | |
|---|---|---|
| EP | 0 128 531 A2 | 12/1984 |
| EP | 0 557 625 B1 | 10/1999 |
| GB | 00509196 A | 8/1938 |
| GB | 00550391 A | 4/1941 |
| GB | 965901 | 8/1964 |
| GB | 1 209 099 | 10/1970 |
| GB | 1 356 465 | 6/1974 |
| GB | 2 074 085 A | 10/1981 |
| GB | 2074085 | 10/1981 |
| GB | 2265077 | 9/1993 |
| JP | 5305689 | 11/1993 |
| JP | 01271273 | 10/2001 |
| JP | 2004-34354 A | 2/2004 |
| WO | WO 92/10119 | 6/1992 |
| WO | WO 00/39215 | 7/2000 |
| WO | WO 01/58656 A1 | 8/2001 |
| WO | WO 2004/054775 | 7/2004 |
| WO | WO 2005/088005 A1 | 9/2005 |
| WO | WO 2006/092666 A2 | 9/2006 |

* cited by examiner

METHOD AND APPARATUS TO PRODUCE STRETCHABLE PRODUCTS

CROSS-REFERENCE

This application claims the benefit of U.S. provisional application Ser. No. 60/625,480 filed Nov. 5, 2004, the disclosures of which is incorporated herein by reference.

FIELD OF THE INVENTION

The present invention relates to methods and apparatus for producing products such as two-dimensional and three-dimensional products, composed of flexible, stretchable and/or elastic materials such as natural elastomers and other synthetic polymers. The invention also relates to methods and apparatus for coating the products with fibres, making perforated stretchable and/elastic products, and for removing such products from formers.

BACKGROUND OF THE INVENTION

Methods for making products of natural or artificial latex rubbers are known in the prior art. Such methods include a dipping stage whereby a mould is dipped in liquid latex, or a press stage. In order to build up the latex to a desired thickness and to reduce the product stickiness, several known techniques are used. Examples of such techniques are based, for instance, on the use of coagulants to control the thickness, diatomite earth products as releasing agent and heating of the mould to build up a thicker layer of latex.

However, prior techniques for making products from natural or artificial latex have a number of disadvantages. For instance, such techniques result in products that are often very thin or very thick and are useless wherein a non-rubber tactile surface feeling is desired, particularly for products that touch skin. In addition, prior techniques do not easily allow for releasing and stripping of very thin products from their moulds without damaging the products. Liquid and gas jets have been used to separate products from their mould, for example, stripping balloons, gloves, and the like. However, the use of liquid and gas jets is inadequate to remove products that are massively perforated before removal from their moulds. Moreover, prior separation techniques are useless for removing protective garments and bandages which may include absorptive pads as the pad might be damaged.

It is also difficult to control the thickness of latex products using conventional techniques. For instance, traditional dipping methods involve a mould and a dipping tank wherein the mould is dipped in the dipping tank either in a vertical movement or in a circular movement towards the liquid latex contained in the tank. A major disadvantage of the dipping method is that when a large mould is dipped into the tank, it is almost impossible to keep all parts of the mould dipped for the same amount of time because the parts dipped first come out last. This disadvantage is not eliminated by the diagonal dipping technique and it is very difficult to achieve a latex layer with even thickness. In addition, it is also impossible to selectively control the thickness of the layers and to create areas having different thicknesses in the final product. For example, it is difficult or impossible to make products such as protective undergarments wherein the thickness of the waist and leg openings are different than that of other parts of the garment.

A further disadvantage of the dipping methods is air bubbles forming along the surface of the mould and getting trapped underneath the mould. This causes unwanted holes and damage to the surface area of the product.

The delicate, and therefore slow, process of dipping as known in the art, makes the methods time consuming, more so when relatively large or complex shaped three dimensional moulds are employed.

A further disadvantage of the dipping method is that it forces the dipping of the whole mould, thereby not allowing the cover of specific required locations, causing waste in product material.

Furthermore, it is known in the art that latex products may be coated with natural or synthetic fibres in order to create a smooth and cosy feeling for the wearer, particularly where protective garments are involved. The fibres are "flocked" over a sticky layer of latex or adhesive on the latex. However, in order to coat a product on both sides, the steps of stripping the cured latex products from the former and refitting them on the former for coating the second surface of the product are needed and several layers of latex and/or adhesive must be applied to allow the fibres to adhere. Thus, methods known in the art for coating latex products with fibres result in increased product thickness and require complex manufacturing processes.

Accordingly, methods are needed to overcome the above-mentioned disadvantages. In particular, methods are needed to remove products from their moulds without damaging the products; to apply loose fibres easily to products on one or both sides; to generate perforations in the product without the need for stripping the product first or making additional steps; and to create products with uniform or varying thickness in a controlled manner. Thus, the present invention provides methods that overcome the above-mentioned disadvantages and result in products that can be efficiently perforated and efficiently removed from their moulds. In addition, the methods of the invention provides ways to efficiently apply double-sided fibre coatings to products and to create products with varying thickness in a controlled manner.

SUMMARY OF THE INVENTION

The present invention is generally related to methods and apparatus for producing stretchable, elastic or shape-retaining products composed principally of materials such as resilient elastomers including but not limited to natural latex rubber or polyurethane, using controlled spraying of the principal material onto a surface of a wall such as a workpiece former. The resulting product may have a uniform thickness or different thicknesses at different regions as desired. Different thicknesses at different regions of a product may be desired to reinforce regions of a product such as leg or waist openings in a garment or reinforced edge of an industrial filter or membrane. The present invention is also directed to methods and apparatus for preparing products having a single or double-sided surface coating of loose fibers, a method and apparatus for generating perforations in such products with or without loose fiber coatings, and methods and apparatus for removing such products off a workpiece former.

In one embodiment of the invention, a method and apparatus for producing a stretchable workpiece is provided. The method comprises: applying a first layer of loose fibres onto at least a portion of a surface of a wall to produce at least a partially fibre-coated product surface, the first layer of loose fibres readily removable from the wall surface; and spraying liquid material, e.g. liquid latex, onto the at least partially fibre-coated wall surface to form a product material layer on the at least partially fibre-coated surface and produce the stretchable workpiece, wherein the product material layer has an inner and outer surface and the fibres are attached to the inner surface of the product material layer. This allows for the formation of products having at least part of the inner surface—the product surface facing the wall surface—coated with loose fibres. Walls include two-dimensional work piece formers such as a flat conveyor belt or a three-dimensional workpiece formers having a complex shape to which a workpiece substantially conforms. The loose fibres may be made of any suitable material including natural or synthetic materials. These materials may be absorbent. Representative fibres include lightweight cotton fibres or viscose fibres.

In one aspect of this embodiment, the method further comprises the step of applying a second layer of loose fibres onto the outer surface of the product material layer. The loose fibres may be applied directly to the outer surface of the product material layer where the product material layer is wet or has not fully dried. Alternatively, the product material layer may be dried first and then at least one layer of an adhesive or a second product material layer is applied to the product material layer to form an adhesion layer. The loose fibers may then be applied to the adhesion layer. This allows for the formation of products having inner and outer surfaces coated with loose fibres.

In another aspect of this embodiment, wherein prior to application of the loose fibres, the wall surface is wetted with water or an aqueous solution so as to allow the loose fibres to temporarily adhere to the surface before the liquid material spray is applied.

In another aspect of this embodiment, the method further comprises the steps of: allowing the product material layer to dry; and removing the stretchable workpiece from the surface.

In another aspect of this embodiment, the wall has a perforation or a plurality of perforations. By having a wall with multiple perforations, products may be conveniently formed with holes, to allow for passage of air or other gases and or liquids. A wall with a single perforation can be used to generate products with a hole for inserting a connector, tubing, fastener, hooks, and the like. Typically, the liquid material spraying is carried out such that at least no substantial product material layer forms over the perforations.

In another aspect of this embodiment, the wall comprises breathable constructed components made of any suitable material such as plastic, composite, or metal. These materials may include pores or openings that would make the material permeable to gas or liquid. This would allow air or another gas or liquids to be forced through the wall under suitable pressures either during or immediately after spraying of the liquid material so as to generate holes in the product material layer without damaging the product. Thus, instead of having a wall with built-in perforations to generate holes in the product, gentle gas flow through the wall would generate the perforations in the wet product material layer.

In another aspect of this embodiment, a vacuum may be applied to the other side of the wall—opposite to the wall sprayed surface—the wall comprised of breathable constructed material so as to allow loose fibres to temporarily be attached to the surface of the wall prior to liquid material spraying. If desired, the surface of the wall may be wetted with a wetting agent either prior to or during the application of the vacuum but before the addition of the loose fibres, to further facilitate the temporary adherence of the loose fibres onto the surface of the wall.

In another aspect of this embodiment, the workpiece former having a shape to which the workpiece substantially conforms, wherein the wall further comprises at least one embedded breathable element to facilitate easy removal of the product, particularly thin products, without damaging the product. Gas or water, depending on which is more appropriate, can be forced through the breathable element in order to push or dislodge at least a portion of the workpiece away from the surface. Preferably, the workpiece has at least one edge, and at least one breathable element is proximal to the at least one edge so that the edge can be easily lifted from the surface of the wall.

In another embodiment of the invention, a method and apparatus is provided for producing a stretchable workpiece, the workpiece having at least one hole or plurality of holes. The comprises: spraying a product material onto at least a portion of a surface of a wall, the wall having a plurality of perforations, to form a layer of sprayed product material on the surface and produce the stretchable workpiece having holes, wherein the product material layer has inner and outer surfaces. This embodiment may further include a combination of some or all the above mentioned embodiments.

These and other embodiments of the invention will become apparent in light of the detailed description below.

DETAILED DESCRIPTION OF THE INVENTION

Figure 1:
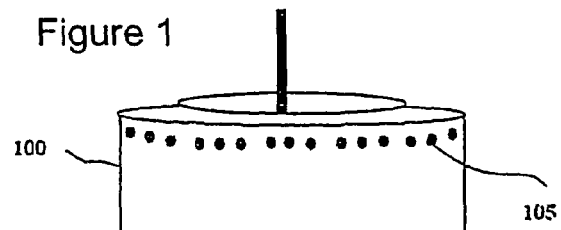
FIG. 1 shows a representative workpiece mould 100 with a plurality of breathing components 105.

The present invention is generally related to methods for producing stretchable, elastic or shape-retaining products composed of principal materials comprising resilient elastomers such as natural latex rubber, polyurethane or other synthetic materials, in a spray able liquid state, using a precise controlled spraying of the liquid material onto a surface of a wall such as a workpiece former. The resulting product may have a uniform thickness or different thicknesses at different regions as desired. Different thickness in different regions of a product may be desirable in order to reinforce regions of a product such as leg or waist openings in a garment. The present invention is also directed to methods and apparatus for preparing products having a flocked single or double-sided surface, that is a surface coated with loose fibers, a method and apparatus for generating perforations in such products, and methods for removing products off a workpiece former. The present invention is also directed to products produced by the inventive methods, a workpiece former, and apparatus for preparing products based on product material spraying. The product produced by the invention has an improved cosy feeling on both sides of the product. A textile-like feeling and a 'textile movement noise' is achieved by using the methods and former of the invention.

The term "flock" or "flocking" refers to the process of attaching or adhering loose fibres onto a surface.

The terms "former," "mould," or "workpiece former" are used interchangeably. A former or mould is an object made of any desired shape or size and serves as shape former for the making of products. For example, if a product in the shape of a face mask is desired, then a former or mould may be constructed that displays the shape and size of desired face mask. The former may be flat and two-dimensional such as a flat belt conveyor. Alternatively, the former may be three-dimensional and have a complex shape to which a workpiece substantially conforms. In addition, the former may be made of any suitable material such as metal (e.g., aluminum), porcelain, ceramic, plastics, or composite (e.g., metal and plastic).

The terms "product" and "workpiece" are used interchangeably and may also include any object that can be produced using the methods, apparatus, and formers of the invention. Stretchable, elastic products have a variety of uses including, without limitation, industrial use such as pipes, seals, membranes sheets, filtering membranes; food industry such as breathable stretchable wrappers or coverings for objects including perishables such as food; medical industry for medical products such as dressings and bandages; sanitation, athletic, and personal hygiene industries such as garments including protective garments and undergarments like brassieres, undershorts, socks, or gloves and any other garment, undergarment or dressing for veterinary or outdoor use. Other examples of garments are described in U.S. Ser. No. 10/723,244, filed Nov. 26, 2003, and in U.S. Ser. No. 09/744,779, filed Aug. 5, 1999, both of which are incorporated by reference in their entirety.

The phrase "loose fibres" refers to any suitable loose flocking fibre material including natural or synthetic materials and may be hydrophilic, hydrophobic, or a combination of the two. Hydrophilic fibers include wettable fibers, i.e., hydrophobic fibers that have been treated with a wetting agent to render them hydrophilic, absorbent fibers, and superabsorbent polymer fibers. Examples of wettable fibers include bicomponent fibers, polypropylene fibers, and polyester fibers that have been treated for example with surfactants. Example of wettable fibers are polyester fibers, such as DuPont-Akra Polyester Type 11A Bright commercially available from DuPont Company treated with a surfactant such as Tween 20 commercially available from ICI Americas Inc. Absorbent fibers are hydrophilic fibers. Absorbent fibers may comprise rayon fibers, acrylic fibers, nylon fibers, polyvinyl alcohol fibers, and fibers of natural or regenerated cellulosics. Example of absorbent fiber is rayon fibers. Superabsorbent polymer fibers are hydrophilic fibers that are swellable and capable of absorbing greater than about 5 grams per gram (of fiber weight) of 1% saline solution. Examples of superabsorbent polymer fibers are polyacrylate fibers, fibers of grafted cellulose, and fibers of maleic acid. Examples of superabsorbent polymer fibers include OASIS Type 101, commercially available from Technical Absorbents Limited and CAMELOT, commercially available from Camelot, Alberta, Canada. A preferred fibre for use in the invention is cotton fibres. Any suitable method for delivering the loose fibres so that they may be applied to the surface can be used. For instance, the loose fibres can be sprayed or blown onto the surface of the wall as well as electrostatically and or pneumatically flocked.

The phrase "product material" comprises suitable stretchable material such as natural or synthetic polymers. A natural polymer includes, without limitation, latex rubber. A synthetic polymer includes, without limitation, polyurethane. For spraying purposes, emulsions, suspensions, or solutions of the product material, e.g., liquid latex rubber, are generally used. After spraying the product material, with or without additional process steps, the product material is preferably allowed to dry before it is removed from a surface. The drying process may include curing or setting processes, depending on the choice of product material. For example, when latex rubber is used as the product material, the latex rubber would cure as it dries. In practicing this invention, the preferred product material is natural latex rubber which forms durable, flexible, stretchable, elastic shape-retaining products.

The term "wall" may refer to a flat or two-dimensional work piece former such as a flat conveyor belt or any suitable shaped flat surface to which a product substantially conforms. Alternatively, the wall may be a three-dimensional workpiece former having a complex shape to which a workpiece substantially conforms. The wall may be made of any suitable materials such as plastic, rubber, composite ((e.g. of metal and plastic or ceramic), ceramics, metal such as aluminum or stainless steel.

In one embodiment of the invention, a method for producing a stretchable workpiece is provided. The method comprises: applying a first layer of loose fibres onto at least a portion of a surface of a wall to produce at least a partially fibre-coated surface, the first layer of loose fibres readily removable from the wall surface; and spraying liquid product material onto the at least partially fibre-coated wall surface to form a product material layer on the least partially fibre-coated surface and produce the stretchable workpiece, wherein the product material layer has an inner and outer surface and the fibres are attached to the inner surface of the product material layer. This allows for the formation of products having at least part of the inner surface—the product surface facing the wall surface—coated with loose fibres, if desired, the method would for further facilitate the production of products having inner and outer flocked surfaces as discussed below.

Prior to the present invention, the manufacture of products having double flocked surfaces is not easy thing to do. Typically, the outer surface of a product contained on a mould would be initially flocked. To flock the inner surface of the product, the product is generally stripped off the mould and turned inside out so as to expose the unflocked inner surface. Adhesive material is layered onto the unflocked inner surface, then loose fibres are applied to the adhesive layer. Because of additional mechanical removal and adhesive application steps, the process of producing double sided flocked products can be difficult and expensive, particularly when thin products are involved. The present invention provides a surprising and significant improvement of the double sided fibre coating procedures by reducing the number of process steps and entailed costs. Moreover, the present invention provides a surprisingly effective and economical way to produce thin products that are flocked at their inner and outer surfaces.

Thus, the inner surface flocked product can be used to prepare a double sided flocked product and in another embodiment of the invention, the method further comprises the step of applying a second layer of loose fibres onto the outer surface of the product material layer. This allows for the formation of products having double-sided flocked (inner and outer) product material surfaces without the need of mechanical removal of the initially flocked product from the former. Preferably the product material layer remains wet or partially wet so that the loose fibres may adhere to the wet product material surface without the need for any added adhesive or extra product material layer. However, if desired, the product material layer may be dried and a suitable adhesive or second product material layer may be subsequently applied to the dried product material surface to form an adhesion layer just prior to applying the loose fibres. The dried product material layer may remain or be removed from the mould prior to the addition of the adhesion layer.

In another embodiment of the invention, the wall has a perforation or a plurality of perforations. A wall with a single perforation or a few perforations can be used to generate products with openings for inserting a connector, tubing, fastener, hooks, or other objects. By having a wall with multiple holes or perforations, products may be conveniently formed with breathable-perforations, holes, or pores to allow for the escape of perspiration or bodily fluids and enhance the wearer's comfort where the products are used on a body. The perforations, holes or pores are also useful for flexible, stretchable and/or elastic products that used as filtering membranes to remove particulates and/or provide gas exchange or as breathable wrappers or coverings to allow for escape of gases, fumes, or vapours such as water vapour or gas exchange. Typically, product material spraying is carried out such that at least no substantial product material layer forms over the perforations. The perforations may be made in the wall of the former or using breathable components or elements such as disks, rods, hollow tubes or "fingers" or any other shaped component suitable for making perforations in the product material. These breathable components can be moulded or embedded into the wall. The generation of perforations or holes in the product may be achieved by careful spraying to prevent substantial product material layer formation over the perforations or by introducing a gas such as air, nitrogen, inert gas (e.g., argon), or any other suitable gas through the holes or through the breathable components when applying or adding the product material to the former, for example, when spraying the product material to the former. The gas pushes through the breathable component and prevents the sprayed product material from forming a layer over the perforation. The perforations may be circular in shape but may have any desired shape such as stars or triangles. The perforations may be of any size and can be arranged in a random fashion or in any suitable pattern or design such as lettering, flowers, or geometric patterns.

In another embodiment of the invention, the wall comprises a breathable constructed components made of any suitable material such as plastic, composite, or metal such as aluminium or stainless steel. These materials may include pores or openings that would make the material permeable to gas or liquid. These breathable materials are commercially available. For instance, suitable breathable stainless steel material may be purchased from Capstan Permaflow (CA, USA); and as Metapor® from Portec (Switzerland). Walls comprised of breathable material are permeable and would allow gas to be introduced through the wall during or immediately after spraying of the liquid product material so as to generate perforations in the product material layer. Thus, instead of having a wall with built-in perforations to generate holes in the product, the flow of gas through the wall of breathable material would generate the perforations in the wet product material layer. Suitable, but not limiting, examples of gas include air, nitrogen, or an inert gas such as argon. Suitable, but not limiting, examples of liquids include water or oil.

As discussed above, the loose fibres may be applied to the surface of the wall by any suitable means. These fibres are readily dislodge from the wall surface once the layer is removed from the wall surface. To allow the loose fibres to temporarily adhere to the surface of the wall prior to applying the product material layer, the surface may be wetted with a suitable wetting agent such as water or any suitable aqueous solution, e.g., a surfactant solution, prior to the application of the loose fibres. The wetting agent should not interfere with the flocking procedure or cause any degradation of the product material layer. Upon product material spraying, the loose fibres will stick to the product material layer and result in the generation of a inner flocked layer on sprayed product.

The loose fibres may also be temporarily adhered to the surface of the wall using a vacuum. In the situation where the wall is comprised of breathable material, a vacuum may be applied to the wall comprised of breathable material so as to allow loose fibres to temporarily adhere to the opposite surface of the wall prior to product material spraying. The vacuum method for loose fibre adhesion may be used in place of the use of a wetting agent on the surface of the wall or may be used in combination with the wetting agent. For instance, the wetting agent may be applied to the surface of the wall, the loose fibers are then applied to the wetted surface, and vacuum is applied to the opposite side of wall to further secure the attachment of the removable fibers to the surface. Upon product material spraying, the substantial loose fibres adhering to the surface of the wall will stick to the product material layer, resulting in the generation of an inner flocked layer on one side of the sprayed product material layer.

In another embodiment of the invention, the wall further comprises at least one breathable element to facilitate easy removal of the product, particularly thin products, without damaging the product. Gas or water, depending on which is more appropriate, can be introduced through the breathable element in order to push or dislodge the workpiece away from the surface of a former (also referred to as a mould). The breathable element may be located on any suitable region of the wall of a former, usually around the edge of the product. Preferably, the workpiece has at least one edge and at least one breathable element proximal to the edge so that at least a portion of the workpiece such as the workpiece edge can be easily lifted from the surface of the wall to facilitate product removal from the mould. The breathable element may be embedded into the wall or is part of the integral wall structure and provides a discrete opening or porous region or zone in the wall to allow gas or water (or other suitable liquid) to pass. Examples of breathable elements may include any suitable shape including hollow tubes or "fingers", disks, rods. These breathable elements may be created has part of a former or embedded into the former. These elements may be made of the same material as the former or any other suitable material such as aluminium, composites (e.g., metal and plastic), plastics. These special breathable components may be connected, through air tubes, to an air compressor or other gas source. When removing or stripping the product from the former is desired, the compressor is used to push air through the breathable components, which result in the product being pushed away off the former or mould. At this stage it is also possible to catch the product's edges and strip it off the mould, either by manual or mechanical means.

In all of the embodiments described herein, once the workpiece is completed, including any additional flocking steps, it is desirable to allow the product material layer to dry prior to removal of the workpiece from the surface of the wall so that to prevent damage to the workpiece.

In some instances, the direct spraying of liquid product material onto a surface of a wall having no adherent loose fibres may be desired. Thus, in another embodiment of the invention, a method is provided for producing a stretchable workpiece, the workpiece having a plurality of perforations. The method comprises: spraying a liquid product material onto at least a portion of a surface of a wall, the wall having one perforation or a plurality of perforations, to form a product material layer on the surface and produce the stretchable workpiece having one or more perforations. If desired, the product material layer can be dried and the resulting workpiece may be removed from the surface, or the wet or partially wet product material layer can be flocked.

As discussed above in other embodiments of the invention, the wall may further comprise at least one embedded breathable element to facilitate easy removal of the product, particularly thin products, without damaging the product.

The direct spraying of liquid product material onto a surface of a wall comprised of breathable material as described above and further having no adherent loose fibres may also be desired. Thus, in another embodiment of the invention, a method is provided for producing a stretchable workpiece, the workpiece having a plurality of perforations. The method comprises: spraying a liquid product material onto at least a portion of an outer surface of a wall to form a product material layer, the wall comprised of breathable material; and applying gas under suitable pressure to an inside surface of the wall and opposite the product material layer to generate a plurality of perforations in the product material layer and produce the stretchable workpiece. The breathable material may include pores or openings that would make the material permeable to gas. This would allow gas to pass through the wall under suitable pressures and into the wet product material layer so as to generate perforations in the product material layer without damaging the product. Thus, instead of having a wall with built-in perforations to generate holes in the product, gentle gas flow through the wall would generate the perforations in the wet product material layer. If desired, the product material layer may be flocked on one or both sides as discussed above.

In another embodiment of the invention, a workpiece former is provided. The workpiece former comprises: a wall enclosing an internal space, the wall having at least two portions, a first portion of the wall having a shape to which a workpiece would substantially conform; a plurality of breathable elements associated with the first portion of the wall; and at least one port for introducing vacuum, gas or liquid into the internal space, the port associated a second portion of the wall. Gas or liquid introduced into the internal space via the port would pass through a plurality of breathable elements under sufficient pressure so as to push the workpiece away from the first portion of the wall, thus allowing for easy removal of the product from the former. In the situation where a workpiece has at least one edge, it is preferred that at least one breathable element associated with the first portion of the wall is proximal to at least one edge of the workpiece. This would allow a portion of the product to lift off the former and allow for easy removal of the product from the former. As discussed above, the wall may be comprised of any suitable porous or breathable material. A workpiece former having a wall of breathable material is desirable as the application of vacuum via the port would allows for the attachment of loose fibres onto the surface of the wall prior to product material spraying as described above. The porous wall would also allow for the passage of gas during or after product material spraying to allow for the generation of perforations or holes in the product material product as discussed above. The workpiece former may include a movable axis for rotating and/or moving the former to any suitable operating position. The workpiece may further include a plurality of perforations or holes in any shape or size to create a desired perforation pattern in the workpiece. In addition, some or all of the breathing elements may further comprise tubes for the delivery of gas or liquid under suitable pressure to dislodge at least a portion of the workpiece off the mould.

Figure 7:
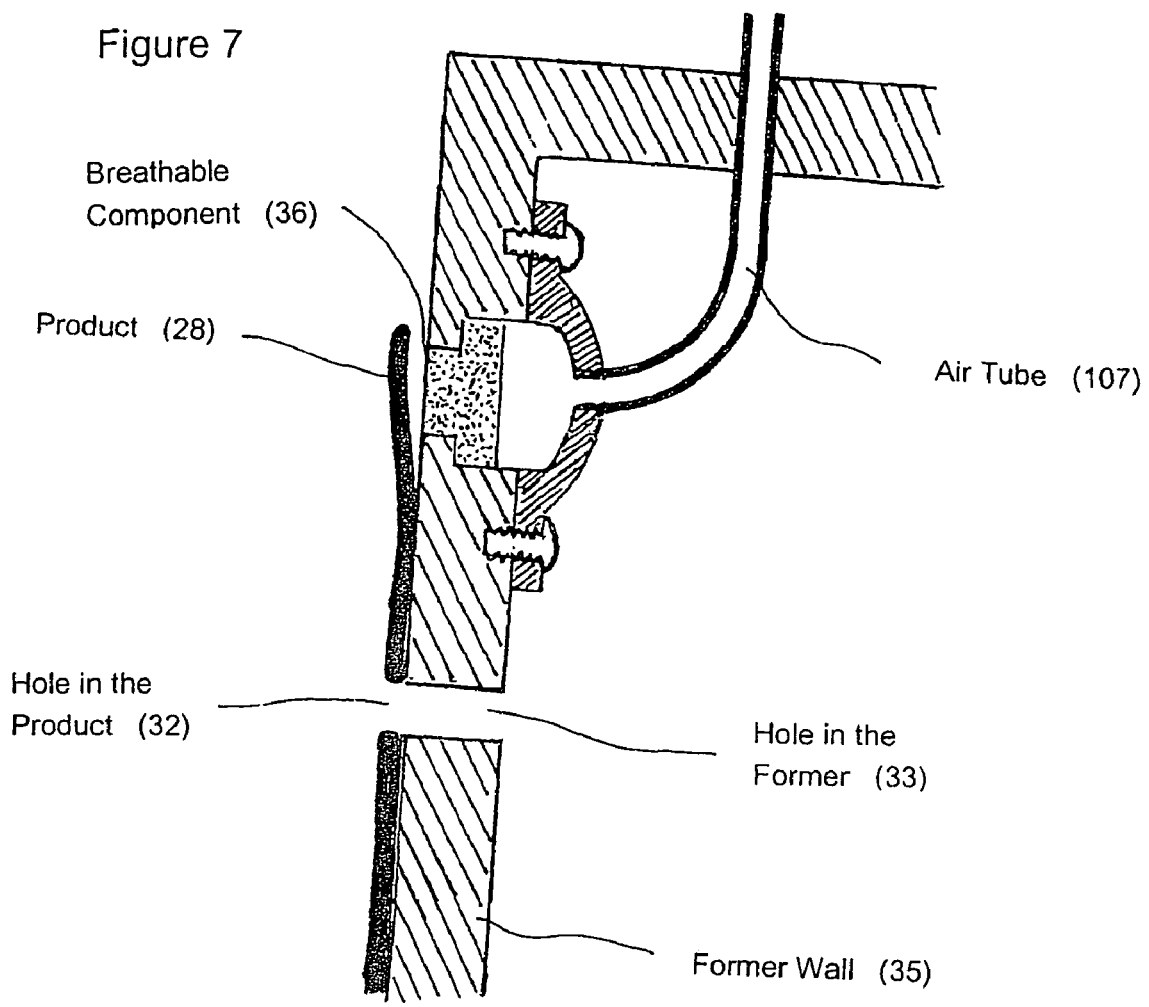
FIG. 7 is shows a cross-section of representative former 100 for producing a three-dimensional product comprising a former wall 35; holes in the wall of the former 33, air tube 107, breathable component or element 36; product 28, and holes in the product 32.

In another embodiment of the invention, a workpiece former is provided. The former comprises: a wall enclosing an internal space, the wall having at least two portions, a first portion of the wall having a shape to which a workpiece would substantially conform; at least one breathable component associated with the first portion of the wall; and at least one port for introducing gas or liquid through the breathable component, the port associated with a second portion of the wall and in fluid connection with the breathable component. When gas or liquid through the breathable component under suitable pressure, the gas or liquid would push at least a portion of the dried workpiece away from the first portion of the wall, facilitating the removal of the workpiece from the former. In the situation where the workpiece has at least one edge, it is preferred that at least one breathable element is proximal to at least one edge of the workpiece. In one aspect of this embodiment, the first portion of the wall may further include a plurality of perforations and the former further comprises a second port for the introduction of gas into the interior space. This would allow for the option of introducing gas to prevent or to blow out any product material films that inadvertently form over and block the perforations. In another aspect of this embodiment, at least the first portion of the wall further comprises breathable material and the former further comprises a second port for the introduction of vacuum or gas into the interior space. This would allow for the introduction of vacuum which in turn allows for the attachment of loose fibres onto the surface of the wall prior to product material spraying. As before, the former may further comprise means for moving and/or rotating the former to a plurality of operating positions. FIG. 7 provides a representative example of this workpiece former. The former includes wall 35 which may include a plurality of optional perforations or holes 33 and a breathable component 36 which is connected to an air tube 107. A dried product 28 including a hole or perforation 33 is attached to the wall 35. When air is introduced into air tube 107 under suitable pressure, it flows through breathable component 36 and the pressure of the introduced air causes at least a portion of product 28 to be pushed off the wall.

In another embodiment of the invention, a workpiece former is provided. The workpiece former comprises: a wall enclosing an internal space, the wall having at least two portions, a first portion of the wall having a shape to which a workpiece would substantially conform; a plurality of perforations associated with the first portion of the wall; and at least one port for introducing vacuum, gas or liquid into the internal space, the port associated a second portion of the wall. If the perforations completely traverse the wall of the former, gas introduced into the internal space via the port would pass through a plurality of perforations and push away or eject any product material film blocking the perforation on the former to ensure the creation of a plurality of perforations in the workpiece. A plurality of optional breathable elements may be included in the first portion, preferably near an edge of the work product. These breathable elements further comprise tubes so as to allow the introduction of gas or liquid under sufficient pressure so as to push the dried workpiece away from the first portion of the wall, thus allowing for easy removal of the product from the former. The workpiece former may include a movable axis for rotating and/or moving the former to any suitable operating position.

Figure 2:
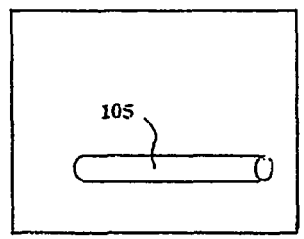
FIG. 2 shows a close-up of a representative breathable component 105 in the form of a hollow tube or finger.

FIG. 1 illustrates a representative workpiece former in the shape of underpants. The former has a plurality of embedded breathing components 105 positioned such that they are proximal to the edges of the leg and waist openings. The workpiece former includes a port 106. FIG. 2 is a close-up view of an isolated breathing component in the shape of a hollow tube or finger.

Figure 3:
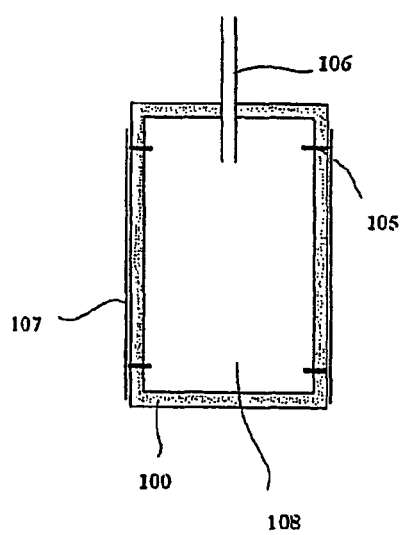
FIG. 3 shows a cross-section of representative mould 100, its internal space 108, finger 105, air tube 106 and a product 107 attached to the outwards surface of the mould.
Figure 4:
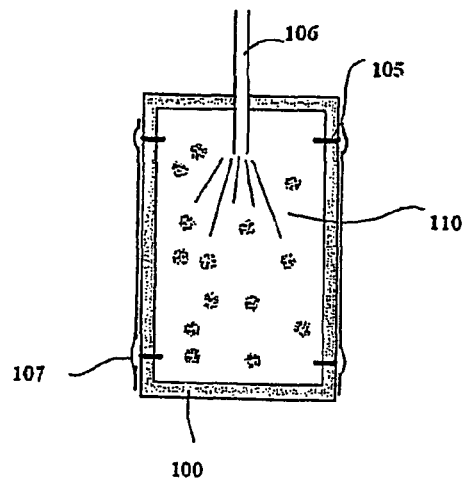
FIG. 4 shows another cross-section of representative mould 100 where air 110 is introduced into the mould's internal space through port 106. The air pushes through the breathing component 105 and pushes at least a portion of the dried product 107 away from the mould.

In another embodiment of the invention, a method is provided for dislodging a workpiece from a surface of a workpiece former, the workpiece former having a shape to which the workpiece substantially conforms and comprising at least one embedded breathable element, said method comprising introducing gas or liquid through the breathable element embedded in the workpiece former under sufficient pressure so as to push the workpiece away from the workpiece former. This method may be performed, for instance, as shown in FIGS. 3 and 4. As shown in FIG. 3, the workpiece former comprises a wall 100 surrounding or enclosing an interior space 108. In FIG. 4, a gas 100, e.g., air, may be introduced into the interior space through port 106. The gas passes through breathing component 105, pushing at least a portion of product 107 away from the mould so that an operator can readily grip and lift the product off the mould.

In another embodiment of the invention, an apparatus for producing a stretchable workpiece is provided. The apparatus comprises a wall, the wall may have single hole or a plurality of perforations to generate perforations in the workpiece; and a sprayer to generate a liquid product material spray onto the wall surface.

In one aspect of this embodiment the wall surface is a workpiece former having a shaped portion to which a work piece substantially conforms In another aspect of this embodiment the wall surface is a complex shape 3D workpiece former.

In further another aspect of this embodiment the wall surface is a flat surface.

In further another aspect of this embodiment the wall surface is a conveyer belt.

In one embodiment of the invention, the apparatus further comprises a positioning device associated with the sprayer or with the wall.

In another embodiment of the invention, the wall further comprises one or more breathable elements embedded in the wall, and a source of a gas or liquid for pushing the workpiece away from the wall.

Figure 5:
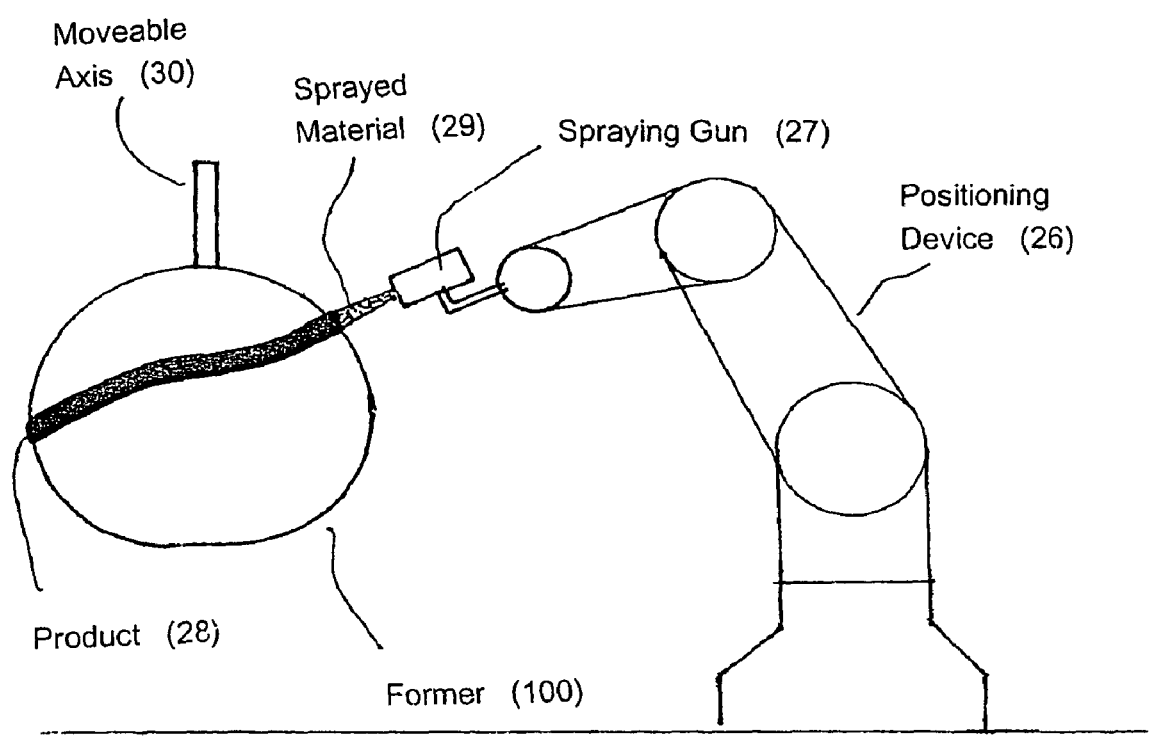
FIG. 5 is shows a representative apparatus for producing a three-dimensional product comprising a former 100; a positioning device 26; a spraying gun 27 for spraying material 29, a movable axis 30, and a product 28.
Figure 6:
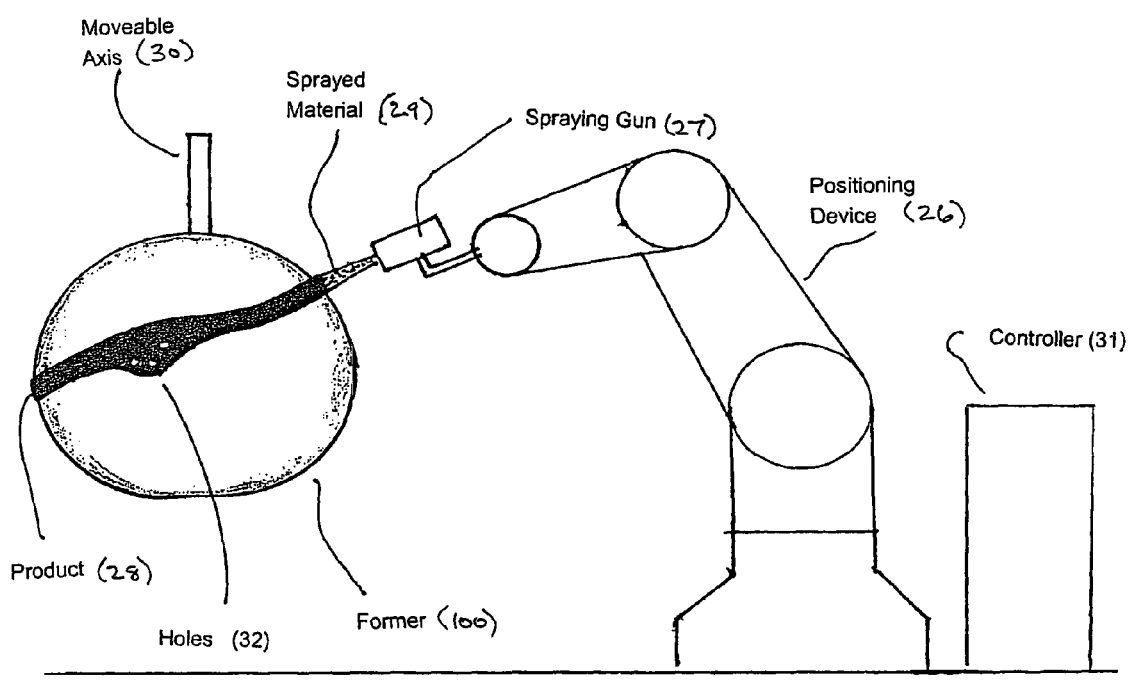
FIG. 6 shows a representative apparatus for producing a three-dimensional product comprising a former 100; a positioning device 26; and a controller 31, a spraying gun 27 for spraying material 29, a movable axis 30, a product 28 having holes 32.

In another embodiment of the invention, an apparatus for producing a stretchable workpiece is provided. The apparatus comprises a workpiece former and one or more sprayers, at least one sprayer directed to spraying liquid product material. An optional positioner for the sprayer may be further included in the apparatus. An optional controller maybe used as part of a positioner system. Representative apparati for preparing stretchable workpieces are shown in FIGS. 5 and 6. Any suitable workpiece former may be used as part of the apparatus, including flat, two-dimensional or three-dimension workpieces having a complex shape to which the workpiece substantially conforms. In practicing this invention, the workpiece formers of the invention are preferred.

Any suitable sprayer or spraying system may be employed in practicing this invention. For spraying liquid product material, wetting agent, or loose fibers to the former, suitable sprayer or sprayer system may include, without limitation, air assisted based, airless based, electrostatic-based sprayers. In addition to the spray gun, these sprayers or sprayer systems may further include compressors, pressure tanks, pressure regulators, feeding pipes and other components known in the art for straying liquid polymers, elastomers such as latex, and other like materials. Representative dedicated airless guns for spraying liquid latex are commercially available for Graco N.V. of Belgium and by Spraying Systems Co. of IL, USA. The sprayer or sprayer system may consist of a single product material spray gun or may include additional spray guns for a variety of purposes such as creating different widths of spray bands, for spraying different compositions such as wetting agents or adhesives or for delivering different materials such as coloured materials or agents or loose fibers. The spray guns preferably have a variable fan facility to enable the creation of thicker bands or layers of product material at desired areas.

For flocking loose fibers onto wet product material or adhesive layer or on a wetted surface, a separate flocking machine may be used independently of the sprayer system used for spraying materials. The flocking machine may be a pneumatic, electrostatic or combined flocking machine suitable for flocking natural or synthetic loose fibres over wet surfaces.

In another embodiment of the invention, the apparatus may further comprise a positioning device for precise controlled of the spray gun movements. In one embodiment, the positioning device may be a robotic arm dedicated for spraying such as the robotic arm manufactured by Fanuc Robotics, ABB, Staubli for spraying paint or any other suitable mechanical device as known in the art, capable of moving the spray gun or the former or both in a precise controlled manner. Representative FIG. 5 illustrates the preparation of a workpiece using a workpiece former 100, a sprayer for spraying product material 27 and a positioning device 26 for positioning the sprayer as shown in FIG. 5. As shown in FIG. 5, liquid product material 29 is sprayed onto a former 100 as the former is being rotated along its movable axis 30. The movable axis 30 also allows for the adjustment of the former along any angle for provide for different operational positions. As product 28 is being formed, the position of either the former, the positioner or both are adjusted.

In yet embodiment of the invention, the positioning device 26 is associated with a controller that adjusts the positional relationship between the spray gun 27 and the mould 100, adjust the fan pattern and control material atomisation and amount of liquid material per given unit of time. This will, in turn, allow for the precise control of the thickness of the sprayed layer. An increase in thickness will then be possible through repeat spraying of specific areas, slower movment over specific areas or heavier flow of the sprayed product material over specific areas. For example, to increase the thickness of the edge of a membrane for the purpose of reinforcing and strengthening the product. The positioning device may independently (or through the controller) control the timing and duration of spraying and will, in another aspect of this embodiment, enable the production of a multicoloured product and various thicknesses within it. Representative FIG. 6 is identical to FIG. 5 except that a separate controller is added to automatically adjust the position of either the former, the positioner, or both, based on data and instructions inputted into the controller. The controller may also adjust the rate of delivery of sprayed product and spray fan angle. If the sprayer is a system that includes a plurality of spray guns for spraying product material, wetting agent, loose fibres, or other materials, the controller may activate and control each individual spray gun and in a particular sequence. Alternatively, a plurality of dedicated positioners may be used, each positioner associated with a sprayer and all under the control of a single controller. Although not shown, a positioning sensor may be placed on the positioner, on the sprayer, or former so that distance and/or angle data between the sprayer and the former can be collected and processed by the controller.

In another aspect of this embodiment, the apparatus may further comprise a vacuum system and a system for delivering loose fibres to the workpiece former. The vacuum allows the fibres to adhere to the former, with or without the use of a wetting agent as described above.

In another aspect of this embodiment, the workpiece former may be perforated to allow for the production of products having perforations or holes as described above. In addition, the workpiece former may include one or more breathable elements embedded in the former. Thus, the apparatus may further include a source of a gas or liquid for pushing the workpiece away from the former. The source of the gas may be an air compressor. The source of the liquid may be a water reservoir attached to a pump.

In another embodiment of the invention, an apparatus and system is provided for preparing a stretchable workpiece which employs a workpiece former, a sprayer, a positioner for the sprayer or former, and a controller whereby the controller adjusts the positional relationship between the former and the sprayer by moving the former, the sprayer, or both simultaneously. By proper positioning of the former and sprayer relative to each other, the sprayer may then properly spray the desired regions of the former. The system provides a fast and accurate way for spraying three-dimensional complex shaped formers to provide three-dimensional stretchable workpieces.

Figure 8:
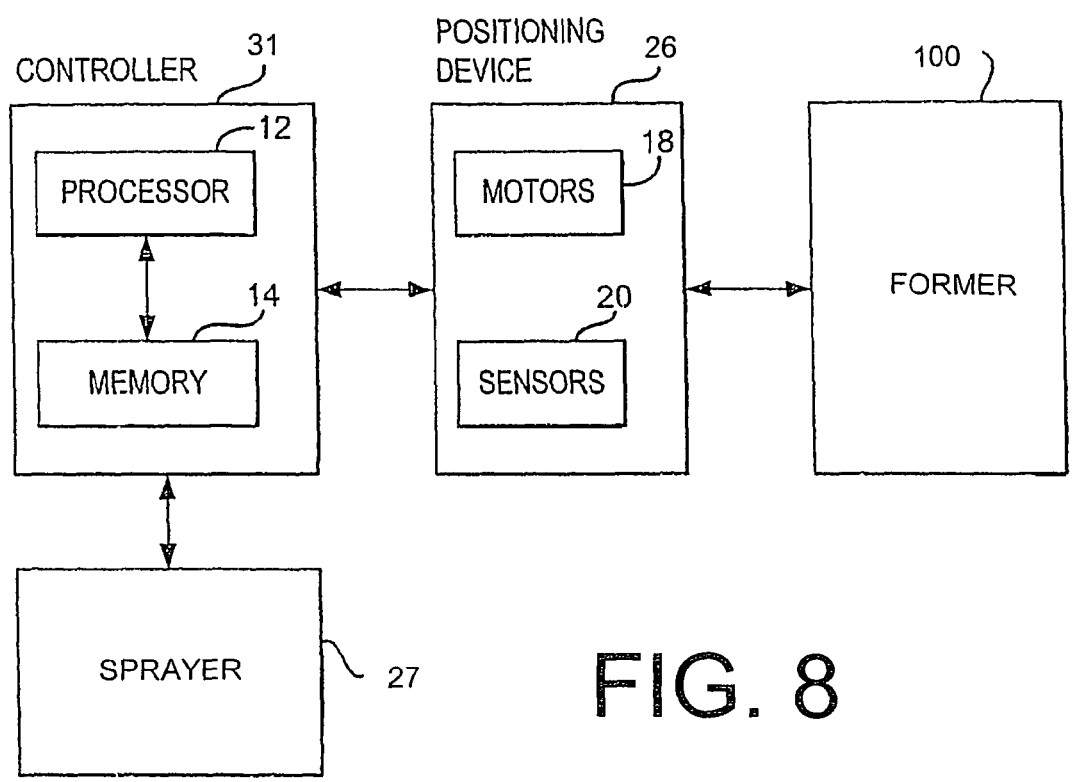
FIG. 8 is a block diagram on one embodiment of the apparatus.

Referring to FIG. 8, a representative block diagram of the system is shown. A controller 31 controls the operation of the system. Examples of a controller include, but are not limited to, a computer, a terminal, a workstation, or some other electronic device capable of controlling the operation of the positioning device 26 and the former 100. The controller 31 includes a processor 12 and a memory 14. The processor 12 may comprise a microprocessor, a microcontroller, or any device which performs arithmetic, logic or control operations. The memory 14 may include any suitable memory device such as non-volatile memory devices such as a ROM, or magnetic or optical memory. The memory 14 may also include volatile memory devices such as a RAM device. Software may be included for the controller to control components within the system, such as the positioning device 26 and former 100.

The controller 31 communicates with the positioning device 26, as described in more detail below. The positioning device 26 includes at least one motor 18 for moving a sprayer 27 (or alternatively moving the former 100). The positioning device 26 may further include at least one sensor 20 for sensing the position of the sprayer 27 (or alternatively sensing the position of the former 100). In an alternate embodiment, the sensors may be located within the controller 31. In one embodiment, the positioning device 26 may be a robotic device as discussed above.

In all the above mentioned embodiments sensing the relative position between the workpiece former and the spraying system may be provided by any other means, including, but not limited to, software, memory, mechanical routines.

A method for preparing a workpiece may be performed as follows. The former 100 and sprayer 27 may be positioned relative to the former 100. In one embodiment, the former 100 is positioned, by a positioning device 26 using motors 18, to a process starting point where the spray system and the workpiece former are in proper working position. In an alternate embodiment, the sprayer 27 is positioned by the positioning device 26 to a process starting point. In still an alternate embodiment, both the former 100 and the sprayer 27 may be positioned by the positioning device 26.

The sprayer 27 may include a variety of controllable parameters. Examples of the parameters include, but are not limited to, amount of liquid material delivered as a function of time, fan pattern, direction, controlled material atomization, and spray gun activation. The parameters for spray operation may be set automatically or manually. If set automatically, the parameters may be determined by accessing the memory 14 which stores the parameters for operation of the sprayer. Alternatively, the sprayer may scan the product using a sensor or sensors (such as a sensor or sensors included with the positioning device 16) on the former to determine aspects of the initial product such as material, thickness, color, etc. of the product. Based on this determination, the memory 14 may be accessed to set the parameters for the sprayer based on the aspects of the product so that further operation steps such as additional spraying of product material bands or layers at specific regions of the initial product for reinforcement may be performed.

After the first step of spraying, the positioning device 26 preferably repositions the former 100 or the sprayer 27, so that the new position on the former 100 is at the effective distance and angle of spray 29. In one embodiment, the positioning device 26 moves or rotates the former 100 in front of the sprayer 27 according to data received from the distance determiner (not shown) and the sensing system 20. Alternatively, the positioning device 26 moves the sprayer 27. In another alternative embodiment, the positioning device 26 moves both the former 100 and the sprayer 27.

The distance between the former 100 and the sprayer along the process can be pre-set for all the steps of the spraying process, for instance by mechanical routine, by software, or by any other suitable method known in the art so the positioning device 26 will correct the relative position between the workpiece former and the spraying system, during the movements along the production process.

Alternatively, the determination and adjustment of relative position can be done in real-time by a measurement or sensing device, such as an optical device, ultrasonic device (for example, the one or more sensors 20 on the positioning device 26), any other proximity sensing device or other devices known in the art, and the data can be transferred to the controller 31 and to the positioning device 26 for appropriate adjustment of the location of the former 100.

Referring to FIG. 5, there is shown a perspective view of a workpiece being made on the former 100 with sprayer 27. The former 100 may be connected to a robotic device (which functions as the positioning device 26). The connection may be made by attaching pole 44 on the former 100 to the robotic device. The former 100 may then be moved. The robotic device may move the former 100 in any direction and to any position so that the spray 29 may contact any portion on the former 100. For example, the sprayer 27 may remain stationary, focusing the spray 29 on a middle portion of the former 100 and the robot may move the former 100 in a circular direction so that the spraying occurs along the circumference of former 100.

One example of the operation of the system is as follows. An industrial robot positions the former 100 using motors 18 of the positioning device 16 in front of sprayer 27 at such a distance that spray will contact at least a portion of the former 100. The parameters of spray 29 may also be adjusted to give optimal performance instead of, or in addition to changing the relative position between sprayer 27 and the former 100.

The former 100 may then be rotated and repositioned by the robot, so that the next area to be sprayed is facing the sprayer 27, at substantially the same distance and substantially at the same angle to the spray 29.

If the former 100 shape is complicated, the robot may be required to make horizontal, vertical, and rotation movements, in order to bring the former 100 to the correct position in three-dimensional space relative to the sprayer. Accordingly, the robot may be required to work in any number of axes.

The movement of the former 100 in front of the sprayer 27 can be done in a continuous and smooth manner, with all movements in all axes being done simultaneously so that with continuous spraying by sprayer 27, formation of the work piece can be achieved quickly. Alternatively, movement of the former 100 in front of sprayer 27 be performed step-by-step, in the case of where additional layers or bands of liquid product material or other materials may be sprayed on an existing product material layer to thicken and reinforce different areas of the product or to add other materials such as loose fibres. In this manner, there is no need to remove the product (such as a garment) from the former 100 in order to produce double-sided flocked garments or other products.

Thus, in one aspect of the invention, an apparatus is provided for preparing a workpiece that conforms to a former. The apparatus comprises: (a) a workpiece former having a shape to which the workpiece substantially conforms; (b) a sprayer to generate a liquid product material spray; and (c) a positioner that makes an adjustment to keep the spray substantially focused on the workpiece during the spraying process. If desired, the workpiece former may further comprise a movable axis to enable rotation and movement to a plurality of operating positions. Adjustments may be made by moving the workpiece former in a direction that changes the distance and angle between the former and the liquid product material sprayer. Alternatively, the adjustment may be made by moving the liquid product material sprayer in a direction that changes the distance between the former and the liquid product material sprayer. The adjust may be made by moving the sprayer or moving the former or both. The workpiece may be flat or two-dimensional. Alternatively, the workpiece may be three-dimensional and the workpiece former has a complex shape to which the workpiece substantially conforms.

In another aspect of this embodiment, the apparatus further comprises: a processor; a memory; and a set of instructions stored in the memory and executable by the processor to move the sprayer and to cause the positioner to make the adjustment based on data stored in the memory that correlates the change in effective position to the sprayer to the workpiece, to adjust spray fan pattern, and to adjust amounts of liquid product material delivered per unit of time. The positioner may comprises a position sensing device (such as an optical sensor or ultrasonic sensor) and a motor. If desired, the positioner may operate in real-time to make the adjustment using input from the position sensing device. If desired, the sprayer comprises a plurality of different spray guns, at least one spray gun generates the liquid product material spray. Alternatively, the sprayer comprises a plurality of different spray guns, at least one spray gun generates the liquid product material spray, and another spray gun generates a loose fibre spray. Alternatively, the sprayer comprises a plurality of different spray guns, at least one spray gun generates the liquid product material spray, a second spray gun generates a loose fibre spray and a third spray gun generates a water spray.

In another aspect of this embodiment, the adjustment further comprises activating a spray gun.

In another aspect of this embodiment, the workpiece former includes perforations, breathable elements embedded in the former, or both. The workpiece former may be any suitable former, preferably the formers of the present invention.

In another embodiment of the invention, an apparatus for preparing a workpiece using a liquid product material spray produced by a sprayer is provided. The apparatus comprises: a workpiece former, the workpiece former being movable to a plurality of operating positions and having a shape to which the workpiece substantially conforms; a positioner comprising a position sensing device; a processor; a memory; and a set of instructions stored in the memory and executable by the processor to move the sprayer to an operating position and to cause the positioner to make the adjustment to the sprayer to keep the liquid product material spray substantially focused on the workpiece during the spraying process. The adjustment being made using input from the position sensing device. The workpiece former may be flat or two-dimensional. Alternatively, the workpiece former may be three-dimensional and have a complex shape to which the workpiece substantially conforms.

In another embodiment of the invention, an apparatus is provided for preparing a workpiece using a sprayer comprising a spray gun for generating a liquid product material spray, a spray gun for generating a wetting agent spray, and a spray gun for generating a loose fibre spray. The apparatus comprises: a workpiece former, the workpiece former being movable to a plurality of operating positions and having a shape to which the workpiece substantially conforms; a positioner comprising a position sensing device; a processor; a memory; and a set of instructions stored in the memory and executable by the processor to move the sprayer to an operating position, to activate a spray gun, and to cause the positioner to make the adjustment to the sprayer to keep the spray substantially focused on the workpiece as the positioner moves the sprayer to an operating position that changes the distance and relative angle between the workpiece and the spray due to the complex shape of the workpiece former, the adjustment being made using input from the position sensing device. The workpiece former may be flat or two-dimensional. Alternatively, the workpiece former may be three-dimensional and have a complex shape to which the workpiece substantially conforms.

In another embodiment of the invention, a method is provided for preparing a three-dimensional workpiece that conforms to a workpiece former having a complex shape, the method using a liquid product material spray, a loose fibre spray, and an optional wetting agent spray, each spray produced by individual spray guns of a sprayer. The method comprises: changing the positional relationship between the sprayer and the workpiece former to establish a first operating position where the surface of the workpiece is substantially at the effective distance where the spray meets the workpiece; changing the positional relationship between the sprayer and the workpiece former to establish a second operating position that changes the distance between the workpiece and the sprayer due to the complex shape of the workpiece former; and making an adjustment to keep the spray substantially focused on the workpiece at the second operating position.

In one aspect of this embodiment, the adjustment comprises moving the workpiece former in a direction substantially parallel to an axis about which the spray is symmetric.

In another aspect of this embodiment, the adjustment comprises moving the sprayer in a direction substantially parallel to an axis about which the spray is symmetric.

In another aspect of this embodiment, the method further comprises: sensing the change in distance and/or the angle between the workpiece and the sprayer caused by changing the positional relationship between the sprayer and the workpiece former from the first operating position to the second operating position, wherein the adjustment is made in response to the sensed change.

In another aspect of this embodiment, the method further comprising: referring to data stored in a memory that correlates the change in distance and/or angle between the workpiece and the sprayer to motion from the first operating position to the second operating position, wherein the adjustment is made in response to the data stored in the memory.

In another embodiment of the invention, a method is provided for producing a three-dimensional workpiece that conforms to a workpiece former having a complex shape, the method using a liquid product material spray produced by a sprayer. The method comprises: establishing a first operating position where the surface of the workpiece former is at an effective distance where the liquid product material spray meets the workpiece former; activating the sprayer to generate a liquid product material spray onto the workpiece former; changing the positional relationship between the sprayer and the workpiece former to establish a second operating position where the surface of the workpiece is at an effective distance where the liquid product material spray meets the workpiece former; activating the sprayer; changing the positional relationship between the sprayer and the workpiece former to establish a second operating position that changes the distance and/or angle between the workpiece and the sprayer due to the complex shape of the workpiece former; and making an adjustment to keep the liquid product material spray substantially focused on the workpiece at the second operating position.

In one aspect of this embodiment, the method further comprises: deactivating the sprayer before establishing the second operating position; and activating the sprayer after the second operating position is established.

In another aspect of this embodiment, the sprayer remains activated as the positional relationship between the sprayer and the workpiece former is changed.

In another embodiment of the invention, a method is provided for preparing a workpiece that conforms to a shape of a workpiece former, the method using a liquid product material spray produced by a sprayer. The method comprises: changing the positional relationship between the sprayer and the workpiece former to establish a first operating position where the surface of the workpiece is substantially at the effective position where the spray meets the workpiece; changing the positional relationship between the sprayer and the workpiece former to establish a second operating position that changes the relative position between the workpiece and the sprayer due to the shape of the workpiece former; and making an adjustment to keep the liquid product material spray substantially focused on the workpiece at the second operating position. The former may be flat or two-dimensional. Alternatively, the former may be three-dimensional and the workpiece substantially conforms to the complex shape of a workpiece former.

In one aspect of this embodiment, the adjustment comprises moving the workpiece former in a direction substantially parallel to an axis about which the liquid product material spray is symmetric.

In another aspect of this embodiment, the adjustment comprises moving the sprayer in a direction substantially parallel to an axis about which the liquid product material spray is symmetric.

In another aspect of this embodiment, the method further comprises: sensing the change in distance and/or angle between the workpiece and the sprayer caused by changing the positional relationship between the sprayer and the workpiece former from the first operating position to the second operating position, wherein the adjustment is made in response to the sensed change.

In yet another aspect of this embodiment, the method further comprises: referring to data stored in a memory that correlates the change in relative position between the workpiece and the sprayer to motion from the first operating position to the second operating position, wherein the adjustment is made in response to the data stored in the memory.

In another embodiment of the invention, a method is provided for producing a workpiece that conforms to a shape of a workpiece former. The method using an liquid product material spray, a loose fibre spray, and an optional wetting agent spray produced individual guns of a sprayer, the method comprising the following steps in order: establishing a first operating position where the surface of the workpiece former is at an effective position where the liquid product material spray meets the workpiece former; activating a spray gun of a sprayer to generate a spray onto the workpiece former; changing the positional relationship between the sprayer and the workpiece former to establish a second operating position where the surface of the workpiece is at an effective position where the liquid product material spray meets the workpiece former; activating a spray gun of a sprayer to generate a spray; changing the positional relationship between the sprayer and the workpiece former to establish a second operating position that changes the distance and/or angle between the workpiece and the sprayer due to the complex shape of the workpiece former; and making an adjustment to keep the spray substantially focused on the workpiece at the second operating position. The former may be flat or two-dimensional. Alternatively, the former may be three-dimensional and the workpiece substantially conforms to the complex shape of a workpiece former. In one aspect of this invention, the method further comprises: deactivating the sprayer before establishing the second operating position; and activating the sprayer after the second operating position is established. In another aspect of this invention, sprayer remains activated as the positional relationship between the sprayer and the workpiece former is changed.

It will be appreciated by persons skilled in the art of that the present invention is not limited by what has been particularly shown and described hereinabove. Rather the scope of the present invention includes variations and modification of the various features described in the specification and shown in the drawings which may occur to a person of ordinary skill in the art upon reading the foregoing description and which are not in the prior art.

What is claimed is:

1. A method for producing a stretchable removable workpiece, the workpiece having predetermined areas of equal or different thicknesses and having an inner surface and an outer surface with loose fibers adhering thereto, the method comprising:

(1) providing a workpiece former having a surface;
   (2) applying a wetting agent onto at least a portion of the surface of the workpiece former so as to form a wetted surface on the workpiece former;
   (3) spraying loose fibres onto at least a portion of the wetted surface on the workpiece former, wherein the loose fibres temporarily adheres to the wetted surface to form a fibre coated surface;

(4) spraying liquid product material onto at least a portion of the fibre coated surface of the workpiece former in a controlled manner so as to form a stretchable removable workpiece having predetermined areas of equal or different thicknesses and having an inner surface and an outer surface, wherein at least a portion of the inner surface of the workpiece has the loose fibres adhering thereto and wherein said spraying of liquid product material is controlled by adjusting the:
  (a) relative position of the sprayer and the surface of the workpiece former;
  (b) spray fan pattern;
  (c) amount of sprayed material delivered per unit time;
  (d) timing or duration of the spraying; or
  (e) material atomization; and
(5) spraying loose fibres onto at least a portion of the outer surface of the workpiece, wherein the loose fibres adhere to the outer surface of the workpiece.

2. The method according to claim 1, wherein the workpiece former includes a single or a plurality of perforations, the spraying is carried out such that no product material layer forms over the single or a plurality of perforations on the workpiece former so as to form the workpiece including at least one perforation.

3. The method according to claim 1, further comprising administering a gas or a liquid under suitable pressure through the workpiece former during the spraying so as to form the workpiece including at least one perforation, wherein the workpiece former includes at least one of (i) a single or a plurality of perforations and (ii) breathable components.

4. The method according to claim 1, further comprising step (3) administering a gas or a liquid under suitable pressure through the workpiece former so as to push at least a portion of the workpiece away from the workpiece former, wherein the workpiece former is made of breathable material or includes breathable components.

5. The method according to claim 1, wherein at least a portion of the outer surface of the workpiece is not fully cured.

6. The method according to claim 1, wherein at least a portion of the outer surface of the workpiece includes an added layer of adhesive.

7. The method according to claim 1, wherein at least a portion of the outer surface of the workpiece includes an added layer of liquid product material.

* * * * *